(12) United States Patent
Kalm

(10) Patent No.: US 10,968,993 B1
(45) Date of Patent: Apr. 6, 2021

(54) HELICAL DRIVE ACTUATOR

(71) Applicant: Amazon Technologies, Inc., Seattle, WA (US)

(72) Inventor: William Scott Kalm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 342 days.

(21) Appl. No.: 16/037,324

(22) Filed: Jul. 17, 2018

(51) Int. Cl.
  *F16H 25/00* (2006.01)
  *F16H 25/22* (2006.01)
  *F16H 25/20* (2006.01)

(52) U.S. Cl.
  CPC ..... *F16H 25/2261* (2013.01); *F16H 25/2285* (2013.01); *F16H 2025/2081* (2013.01); *F16H 2025/228* (2013.01)

(58) Field of Classification Search
  CPC ............. F16H 25/2261; F16H 25/2285; F16H 2025/228; F16H 2025/2081
  USPC .............. 74/424.76, 424.81, 424.88, 424.89, 74/424.91
  See application file for complete search history.

(56) References Cited

U.S. PATENT DOCUMENTS

| 431,067 | A | * | 7/1890 | Lieb | F16H 25/2266 |
| | | | | | 74/424.91 |
| 3,296,880 | A | * | 1/1967 | Maroth | F16C 19/49 |
| | | | | | 74/424.93 |
| 3,308,674 | A | * | 3/1967 | Maroth | F16H 25/2261 |
| | | | | | 74/424.93 |
| 3,329,036 | A | * | 7/1967 | Whittaker | F16H 25/2247 |
| | | | | | 74/424.91 |
| 3,779,257 | A | | 12/1973 | Wenger | |
| 4,440,038 | A | * | 4/1984 | Potter | F16H 25/2261 |
| | | | | | 74/424.93 |
| 4,665,765 | A | * | 5/1987 | Heine | F16H 1/163 |
| | | | | | 74/424.93 |
| 4,909,099 | A | * | 3/1990 | Ulbing | F16H 25/2409 |
| | | | | | 74/640 |
| 8,011,264 | B2 | | 9/2011 | Tsubono et al. | |
| 2004/0007440 | A1 | | 1/2004 | Doan | |
| 2006/0070473 | A1 | * | 4/2006 | Yang | F16H 25/2247 |
| | | | | | 74/424.91 |
| 2007/0137331 | A1 | * | 6/2007 | Kachouh | E05F 15/622 |
| | | | | | 74/89.23 |
| 2008/0282826 | A1 | * | 11/2008 | Pan | F16H 25/2247 |
| | | | | | 74/439 |
| 2013/0105283 | A1 | | 5/2013 | Dudek et al. | |

(Continued)

FOREIGN PATENT DOCUMENTS

WO  WO 2018/136441 A1  7/2018

*Primary Examiner* — Victor L MacArthur
(74) *Attorney, Agent, or Firm* — BakerHostetler

(57) ABSTRACT

In one embodiment, an actuator has a roller, a helical track, and at least one track follower. The roller has a cylindrical body that has a first end, a second end that is offset from the first end along a central axis, and a cylindrical outer surface that extends from the first end to the second end. The helical track is disposed around the cylindrical outer surface in a helical pattern. The at least one track follower can be attached to a load, and rides along the helical track when the roller is rotated about the central axis so as to translate the load along an axial direction that is substantially parallel to the central axis. In some embodiments, the roller has an internal motor that is disposed within the cylindrical body.

16 Claims, 4 Drawing Sheets

(56) References Cited

U.S. PATENT DOCUMENTS

| | | |
|---|---|---|
| 2016/0115003 A1 | 4/2016 | Biondich et al. |
| 2017/0225890 A1 | 8/2017 | Li |
| 2018/0172122 A1* | 6/2018 | Parmar ................ F16H 57/082 |
| 2018/0287458 A1* | 10/2018 | Parmar ................... F16H 25/20 |
| 2018/0351247 A1 | 12/2018 | Hall et al. |
| 2019/0307614 A1 | 10/2019 | Shea et al. |

* cited by examiner

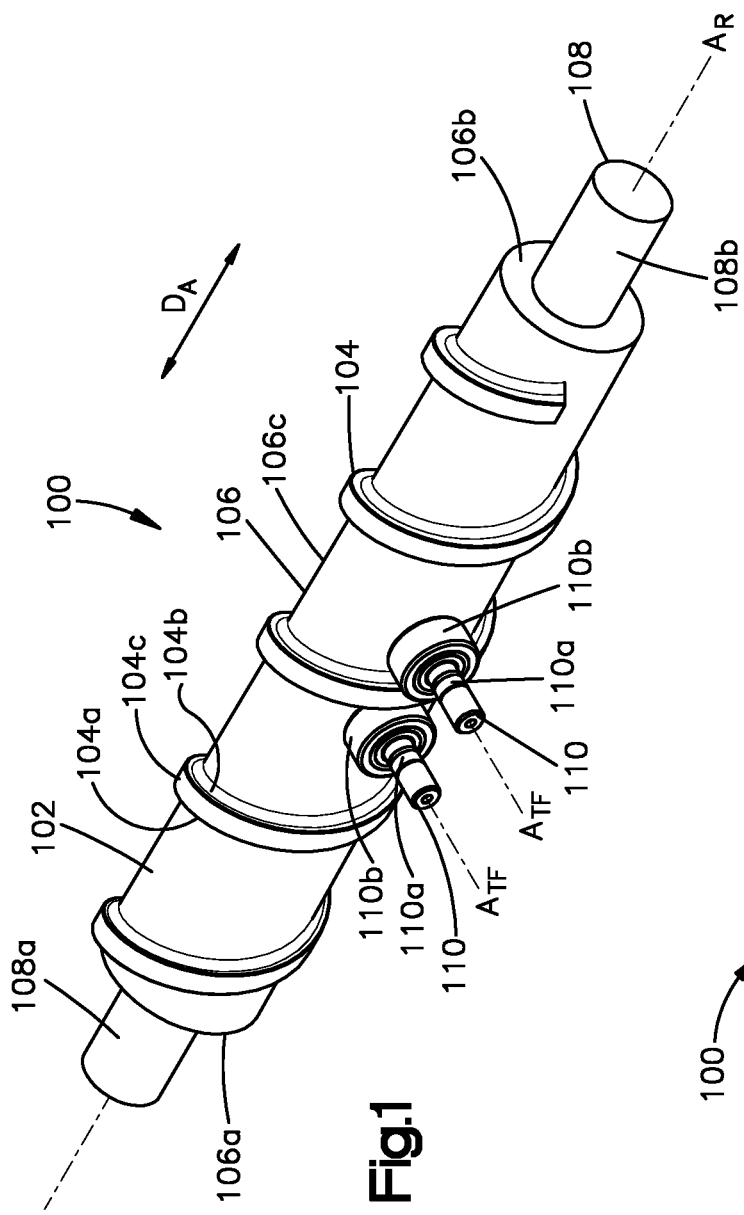
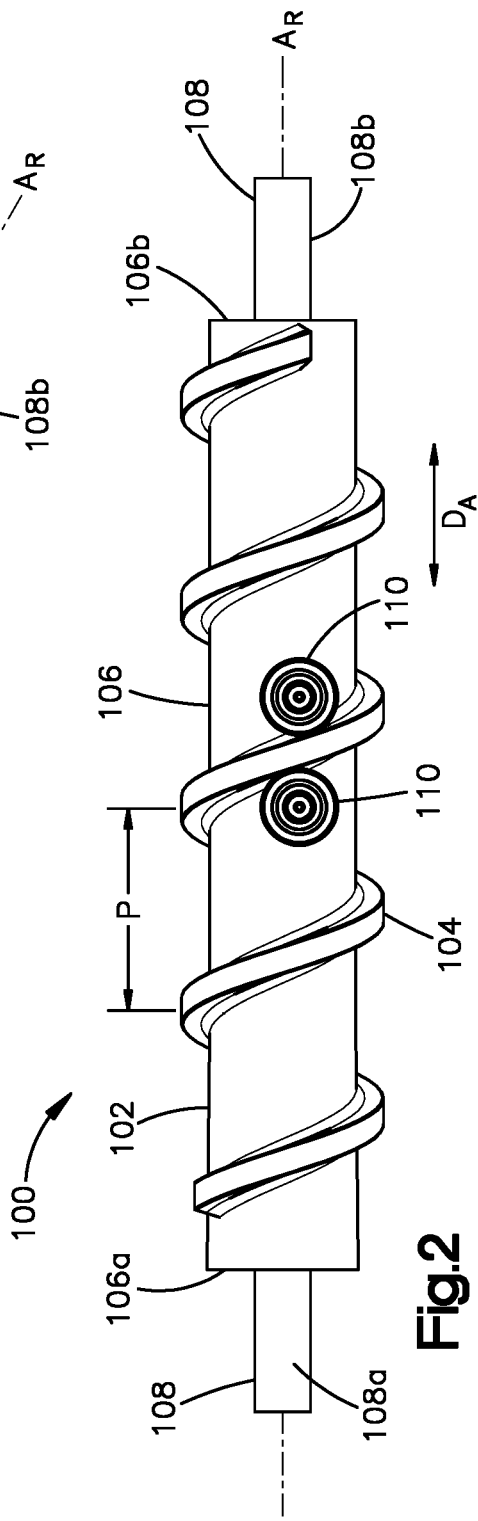

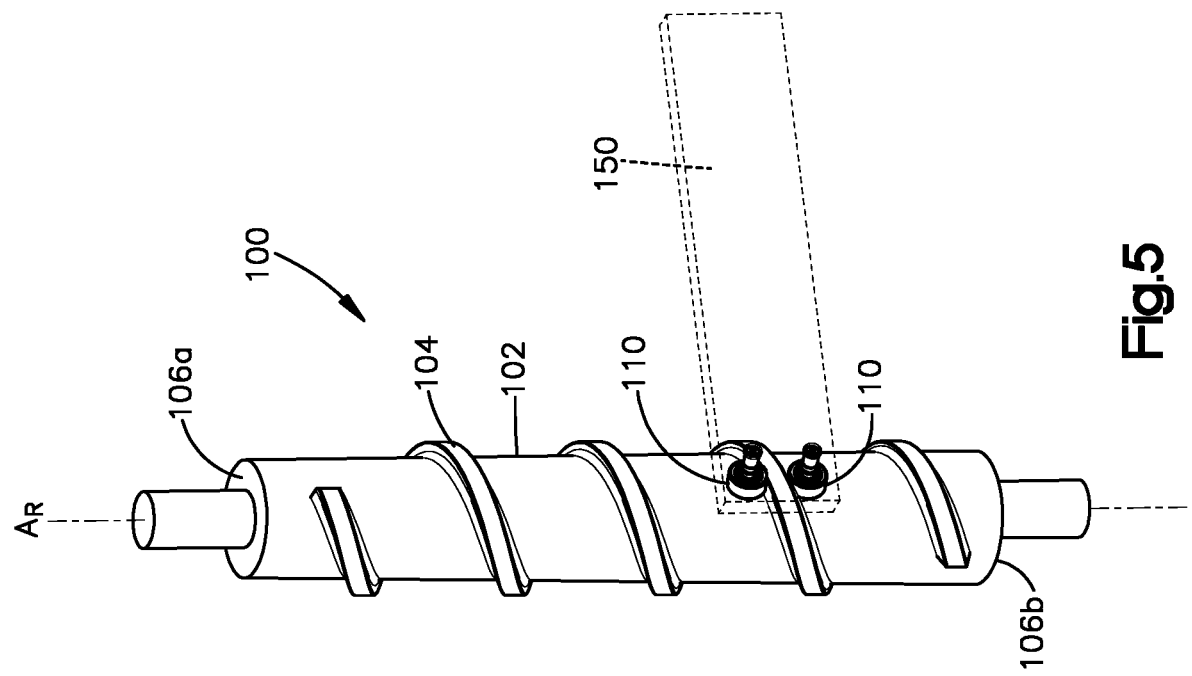
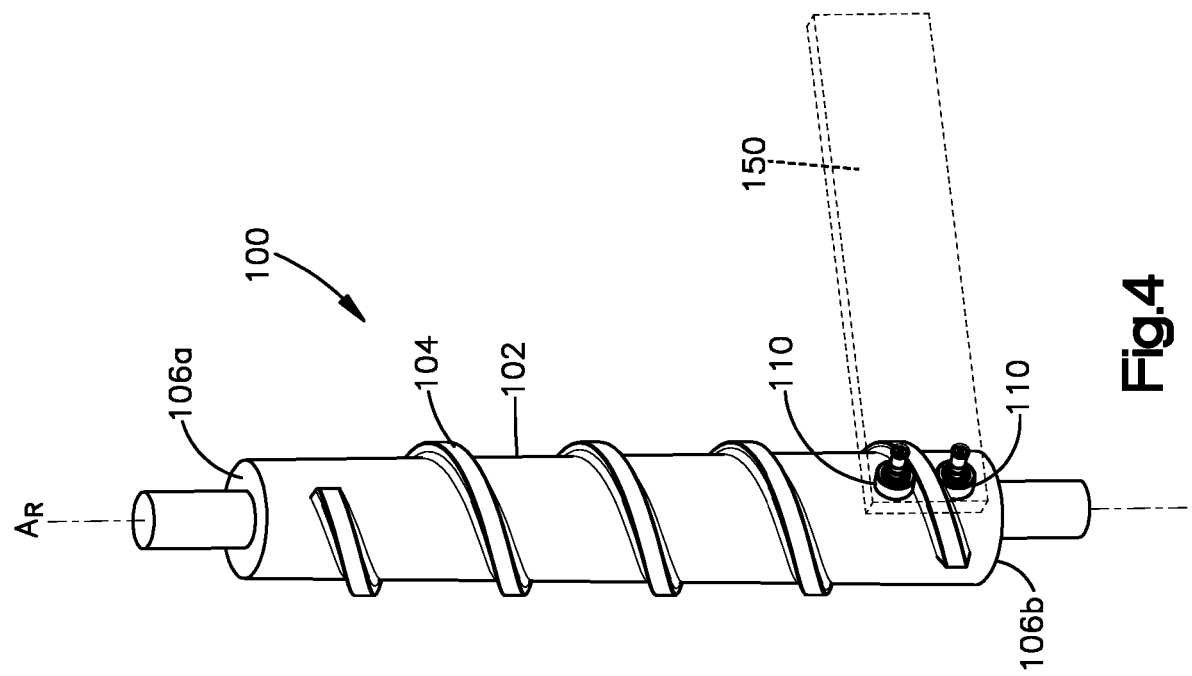

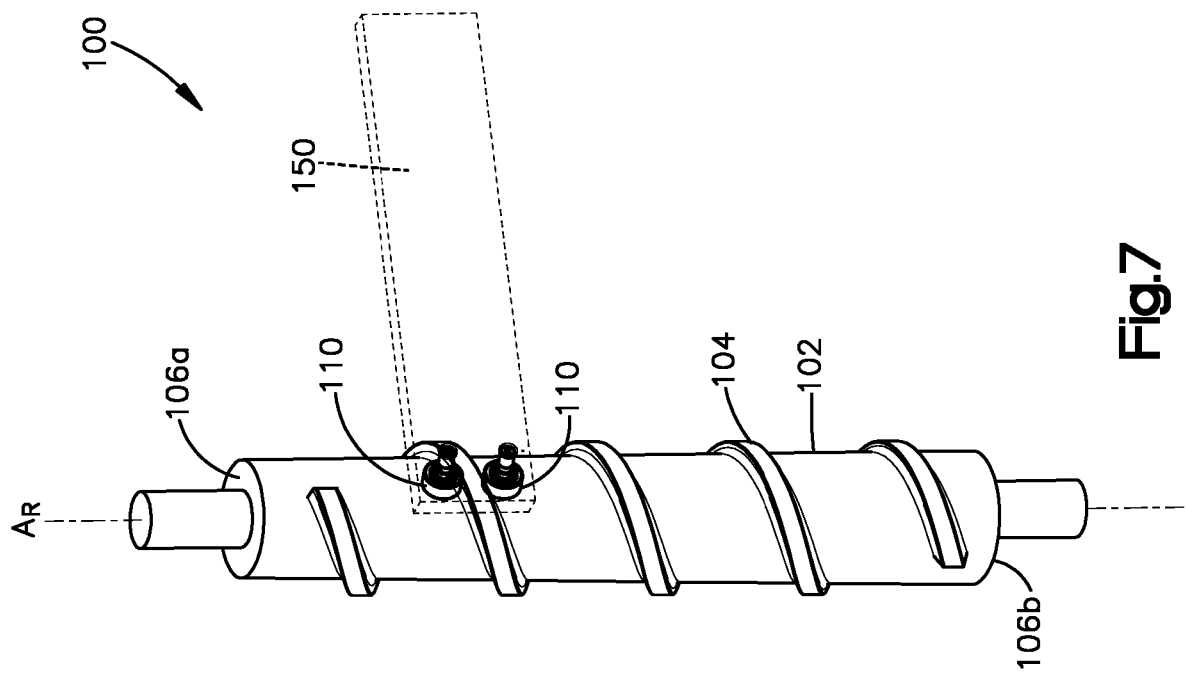
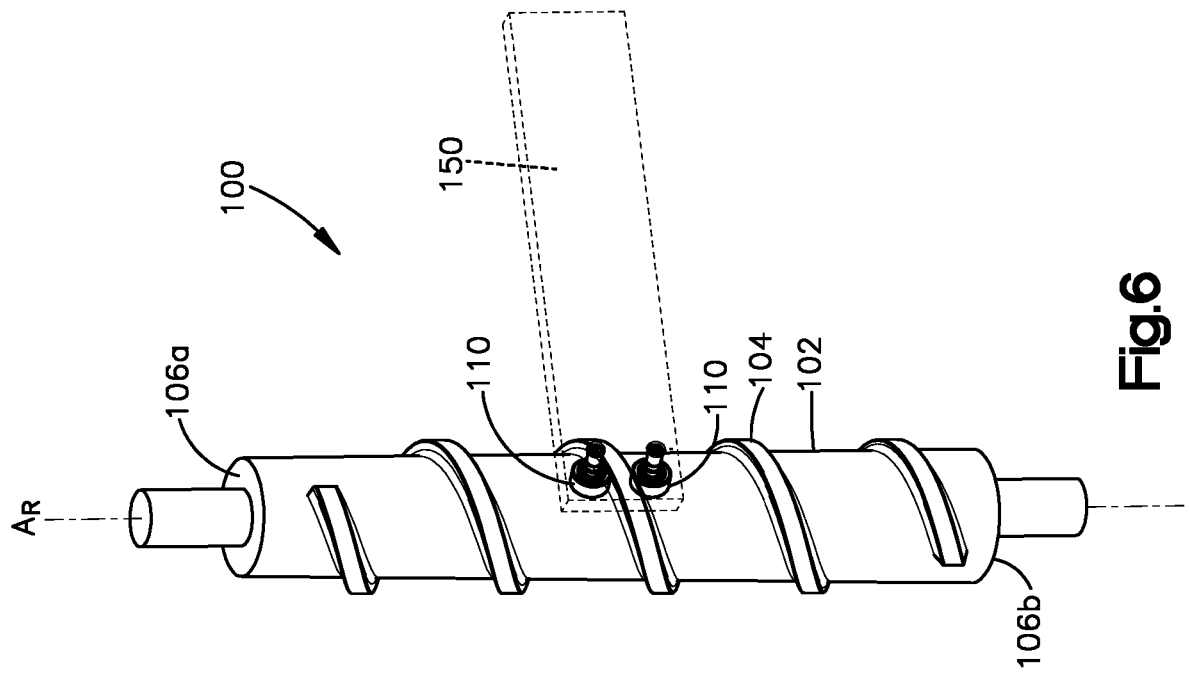

HELICAL DRIVE ACTUATOR

BACKGROUND

Actuators are mechanical or electro-mechanical devices that are commonly used to move or control an object or part of a machine. For example, linear actuators are actuators that create motion in a substantially straight line. Actuators receive energy such as an electric voltage, electric current, pneumatic pressure, or hydraulic pressure from an energy source, and convert the energy into mechanical motion.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 1 shows a perspective view of an actuator according to one example embodiment;

FIG. 2 shows a side view of the actuator of FIG. 1;

FIG. 4 shows an example load attached to the actuator of FIG. 1, where the load is oriented at a first position along the roller;

FIG. 5 shows an example load attached to the actuator of FIG. 1, where the load is moved to a second position along the roller;

FIG. 6 shows an example load attached to the actuator of FIG. 1, where the load is moved to a third position along the roller; and FIG. 7 shows an example load attached to the actuator of FIG. 1, where the load is moved to a fourth position along the roller.

DETAILED DESCRIPTION

Figure 3:
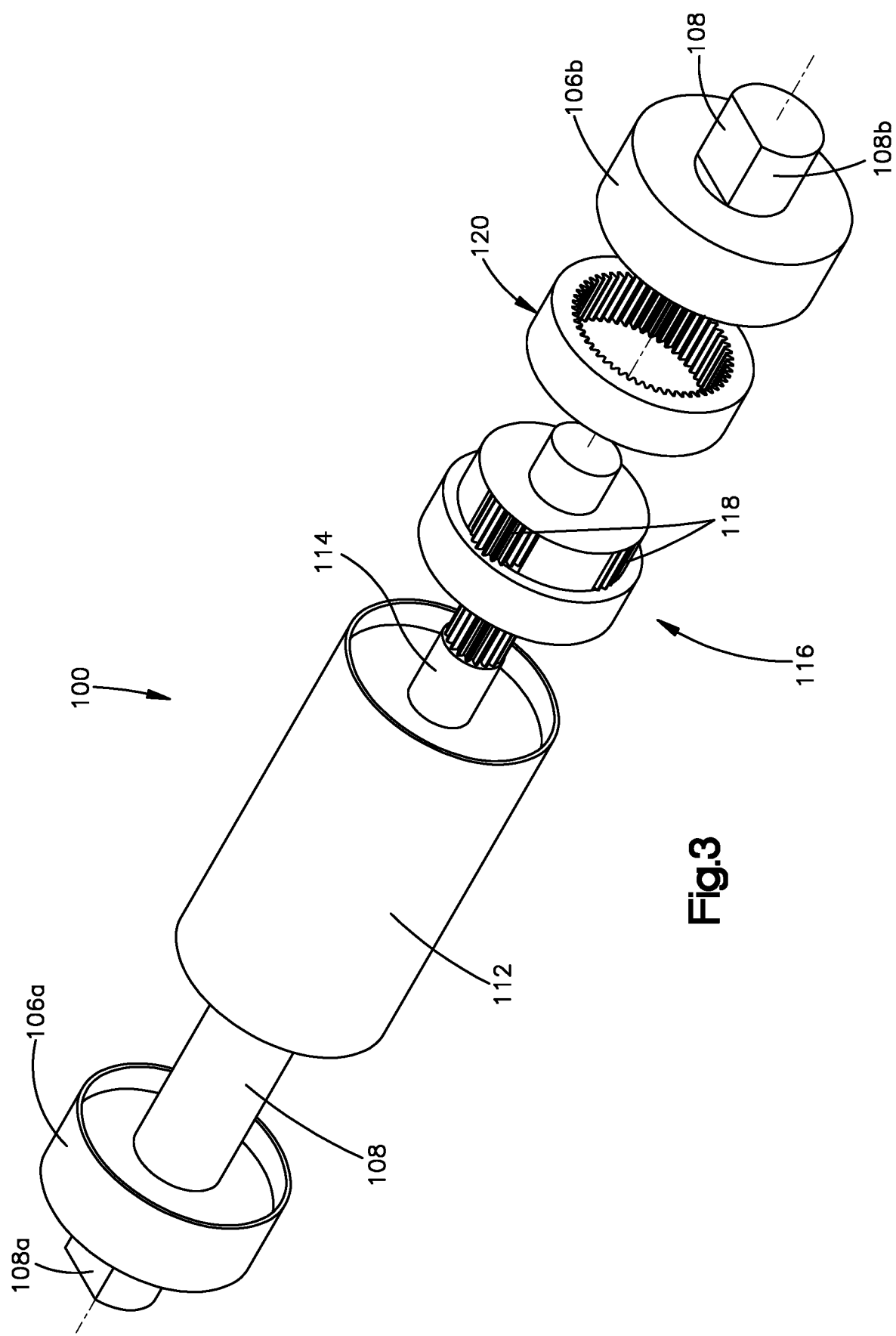
FIG. 3 shows an exploded of a drive roller according to one example embodiment that can be used to implement the actuator of FIG. 1.

Referring to FIGS. 1 and 2, an actuator 100 is shown that comprises a roller 102 and a helical track 104 disposed around the roller 102 in a helical pattern. The helical pattern can be similar to that of a thread on a screw. The actuator 100 can further comprise at least one track follower 110 configured to ride along the helical track 104 when the roller is rotated about a central axis $A_R$. The roller 102 can be a conveyor roller used in conveyor systems. The roller 102 has a cylindrical body 106 that extends along a central axis $A_R$. The cylindrical body 106 has a first end 106a and a second end 106b that are offset from one another along the central axis $A_R$. The cylindrical body 106 has a cylindrical outer surface 106c that extends from the first end 106a to the second end 106b. In some embodiments, the cylindrical body 106 can define a cylindrical shell having the cylindrical outer surface 106c and an interior cavity within the cylindrical shell.

The roller 102 has at least one shaft 108 that extends outwardly from the first and second ends 106a and 106b of the roller 102 along the central axis $A_R$. The at least one shaft 108 can be a single shaft or can be two separate shafts extending from either end of the cylindrical body 106. The at least one shaft 108 has a first shaft end 108a and a second shaft end 108b that are offset from one another along the central axis $A_R$. The actuator 100 comprises a motor that is configured to rotate the cylindrical outer surface 106c about the central axis $A_R$. The motor can be disposed within the roller 102 as will be described in further detail below in regards to FIG. 3 so as to rotate the cylindrical outer surface 106c when a position of at least one of the first and second shaft ends 108a and 108b of the at least one shaft 108 is fixed. Alternatively, the motor can be disposed outside of the roller 102 and can be configured to rotate the shaft 108, which in turn rotates the cylindrical outer surface 106c. For example, the at least one shaft 108 of the roller 102 can be a drive shaft of the motor. As another example, the drive shaft of the motor and the at least one shaft 108 can be coupled together by a belt, chain, gear, or other mechanical device such that rotation of the drive shaft in turn drives rotation of the at least one shaft 108.

The helical track 104 extends around the curved outer surface 106c in the helical pattern. The helical track 104 can be welded to, otherwise attached to, or formed integrally with, the cylindrical outer surface 106c. The helical track 104 is rotationally fixed with respect to the cylindrical outer surface 106c such that rotation of the cylindrical outer surface 106c causes rotation of the helical track 104. The helical track 104 has at least one guide surface that is configured to guide the at least one track follower 110 along a helical path around the actuator 100 as the roller 102 is rotated. In at least some embodiments, the at least one guide surface can include first and second guide surfaces 104a and 104b that are opposite from one another. The first and second guide surfaces 104a and 104b can be configured to guide first and second track followers 110, respectively, along the helical path around the actuator 100. The helical track 104 can have an outer edge 104c that is spaced from the cylindrical outer surface 106c and that defines a crest of the helical track 104. Each of the at least one guide surface 104a and 104b can extend from the cylindrical outer surface 106c to the outer edge 104c.

Turning briefly to FIG. 3, one example embodiment of the roller 102 is shown with the cylindrical outer surface 106c and helical track 104 removed. The roller 102 comprises an internal motor 112 that is disposed between the first and second ends 106a and 106b of the roller 102. For instance, the motor 112 is disposed within an interior cavity of the cylindrical body 106. Thus, the motor 112 can be positioned radially inward from the cylindrical outer surface 106c. In some embodiments, the roller 102 can be a conveyor roller having an internal motor such as the roller drives manufactured by Interroll Corporation, or similar roller drives manufactured by other manufactures, where the roller drive is modified to include the helical track 104.

The roller 102 can comprise a drive shaft 114 that is coupled to the motor 112. The motor 112 can be configured to rotate the drive shaft 114 about the central axis $A_R$. The roller 102 can comprise an internal gearing 116 that is connected between the drive shaft 114 and the cylindrical outer surface 106c. The drive shaft 114 can be configured to drive the internal gearing 116. The internal gearing 116 can be configured to convert the rotational motion of the drive shaft 114 to rotational motion of the cylindrical outer surface 106c. In one example, the internal gearing 116 can be a planetary gear having a plurality of planet gears 118 and a ring gear 120. Each planet gear 118 can have a cylindrical shape with external teeth disposed about the curved outer surface of the cylinder. Further, each planet gear 118 can have its own central axis $A_P$. The ring gear 120 can have a ring shape with internal teeth disposed about an inner surface of the ring. The ring gear 120 can have a central axis that is aligned with the central axis $A_R$ of the roller 102.

The drive shaft 114 can be configured to rotate each of the planet gears 118 about their respective axes $A_P$. The planet gears 118 can be configured to rotate the ring gear 120 about the central axis $A_R$. The external teeth of each planet gar 118 engages the internal teeth of the ring gear 120. The ring gear 120 can be rotationally fixed with respect to the cylindrical outer surface 106c. Thus, rotation of the ring gear 120 can cause the cylindrical outer surface 106c to rotate about the central axis $A_R$. At least one, such as both, of the ends 108a and 108b of the at least one shaft 108 can be rotationally fixed relative to the cylindrical outer surface 106c.

Referring back to FIGS. 1 and 2, each track follower 110 can be configured as a cam follower, wheel assembly, or other suitable rolling mechanism. Each track follower 110 can comprise a track roller 110b that is configured to rotate about a central axis $A_{TF}$. Each track roller 110b can be configured as, for example, a wheel or a bearing, that is configured to roll along the at least one guide surface. Each track follower 110 can further include a shaft 110a that extends along the central axis $A_{TF}$. Each track roller 110b can be rotatably coupled to a respective one of the shafts 110a such that the track roller 110b can rotate relative to the shaft 110a. Each shaft 110a can be configured to attach a respective one of the track rollers 110b to a load so as to translate the load linearly along an axial direction DA that is substantially parallel to the central axis $A_R$ when the roller 102 rotates.

In some embodiments, as shown in FIGS. 1 and 2, the actuator 100 can include first and second track followers 110. The first and second track followers 110 can be positioned on either side of the helical track 104. Thus, the track 104 can be disposed between the first and second track followers 110. In such manner, the first and second track followers 110 can ride along the first and second guide surfaces 104a and 104b, of the track 104, respectively, as the helical track 104 is rotated about the central axis $A_R$.

Turning to FIGS. 4 to 7, an example method of moving a load 150 between the first and second ends 106a and 106b of the roller 102 is shown. In this example, the load 150 is a plate. However, it will be understood that the load 150 can take any other suitable form. Further, the plate is shown as transparent so that the track followers 110 can be seen. In operation, the first and second shaft ends 108a and 108b are fixed such that at least one or both of the first and second shaft ends 108a and 108b do not rotate about the axis $A_R$. The motor of the roller 102 drives the cylindrical outer surface 106c to rotate about the axis $A_R$, thereby causing the helical track 104 to rotate in one of a first rotational direction (i.e., clockwise or counterclockwise) and a second rotational direction that is opposite the first rotational direction. When the helical track 104 rotates in the first rotational direction, the at least one track follower 110 rides along the at least one guide surface 104a and 104b, causing the at least one track follower 110 to translate linearly along a first axial direction that is parallel to the axis $A_R$, such as towards one of the first and second ends 106a and 106b of the body 106. This in turn causes the load 150 to translate linearly along the first axial direction. For example, when viewing FIGS. 4 to 7 in order, the load 150 is translated towards the first end 106a along a first axial direction.

When the helical track 104 rotates in the second direction, the at least one track follower 110 rides along the at least one guide surface 104a and 104b, causing the at least one track follower 110 to translate linearly along a second axial direction that is opposite the first axial direction, such as towards the other one of the first and second ends 106a and 106b of the body 106. This in turn causes the load 150 to translate linearly along the second axial direction. For example, when viewing FIGS. 4 to 7 in reverse order (i.e., from FIG. 7 to FIG. 4), the load 150 is translated towards the second end 106b along a second axial direction.

The actuator 100 can be used in the vertical orientation shown in which the central axis $A_R$ extends along a vertical direction. Alternatively, the actuator 100 can be used in any other suitable orientation, including (without limitation) a horizontal orientation in which the central axis $A_R$ extends along a horizontal direction. The actuator 100 can provide a greater mechanical advantage than other linear actuators that do not employ a threading to move a load. As a result, the actuator 100 can drive a load using a smaller motor and/or smaller gearing than a comparable linear actuator driving the same load. Further, the actuator 100 can drive a greater load than a comparable linear actuator having a comparably sized motor and gearing.

Referring back to FIG. 2, the helical track 104 can have a pitch p. In some example embodiments, the pitch p can be constant from the first end 106a to the second end 106b. In some such example embodiments, the actuator 100 can be configured such that when the cylindrical outer surface 106c is rotated at a constant rotational speed, the at least one track follower 110 moves at a constant rate between the first and second ends 106a and 106b along one of the first and second axial directions. The motor can be implemented as a constant speed motor to rotate the cylindrical outer surface 106c at a constant rotational speed. Additionally or alternatively, the actuator 100 can be configured such that when the cylindrical outer surface 106c is rotated at a variable rotational speed, the at least one track follower 110 moves at a variable rate between the first and second ends 106a and 106b along one of the first and second axial directions. The motor can be implemented as a variable speed motor to rotate the cylindrical outer surface 106c at a variable rotational speed.

In other example embodiments, the pitch p can vary between the first and second ends 106a and 106b. For example, the pitch p can be smaller adjacent one or both of the first and second ends 106a and 106b than it is between the first and second ends 106a and 106b (such as midway between the first and second ends 106a and 106b). In such embodiments, when the cylindrical outer surface 106c is rotated at a constant rotational speed, the at least one track follower 110 moves at a variable rate along one of the first and second axial directions. For example, the rate can be higher when the at least one track follower 110 is between the first and second ends 106a and 106b than it is when the at least one track follower 110 is adjacent to one or both of the first and second ends 106a and 106b. Thus, the rate at which the at least one track follower 110 travels along one of the first and second axial directions can decrease towards one or both of the first and second ends 106a and 106b such that the at least one track follower 110 slows towards one or both of the first and second ends 106a and 106b without causing a change in the rotational speed of the roller 102. Accordingly, such embodiments can be implemented with a constant speed motor.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. An actuator, comprising:
   a roller having a cylindrical body that has a first end and a second end that are offset from one another along a central axis, and that has a cylindrical outer surface that extends from the first end to the second end;
   a helical track disposed around the cylindrical outer surface in a helical pattern;
   at least one track follower configured to be attached to a load and configured to ride along the helical track when the roller is rotated about the central axis so as to translate the load along an axial direction that is substantially parallel to the central axis;
   at least one shaft having first and second shaft ends that extend outwardly from the first and second ends of the cylindrical body, respectively, along the central axis; and
   an internal motor that is disposed within the cylindrical outer surface and that is configured to rotate the cylindrical outer surface relative to first and second shaft ends of the at least one shaft so as to rotate the cylindrical outer surface and helical track about the central axis.

2. The actuator of claim 1, wherein the motor comprises a drive shaft, and the actuator comprises internal gearing that is connected between the drive shaft and the cylindrical outer surface such that the drive shaft is configured to drive the internal gearing and the internal gearing is configured to convert rotational motion of the drive shaft to rotational motion of the cylindrical outer surface.

3. The actuator of claim 2, wherein the internal gearing comprises a planetary gear having a plurality of planet gears and a ring gear that engages the plurality of planet gears.

4. The actuator of claim 3, wherein each planet gear has a different rotational axis that is radially spaced from the central axis, and the ring gear has a rotational axis that is aligned with the central axis.

5. The actuator of claim 4, wherein the ring gear is rotationally fixed with respect to the cylindrical outer surface.

6. The actuator of claim 1, wherein the helical track defines a helical path, and the helical track has at least one guide surface that is configured to guide the at least one track follower along the helical path around the actuator as the outer cylindrical surface is rotated about the central axis.

7. The actuator of claim 6, wherein the at least one guide surface includes first and second guide surfaces that are opposite from one another, and the at least one track follower includes first and second track followers that are configured to ride along the first and second guide surfaces, respectively, as the outer cylindrical surface is rotated about the central axis.

8. The actuator of claim 6, wherein each track follower comprises a track roller that is configured to roll along the at least one guide surface.

9. The actuator of claim 8, wherein each track follower comprises a shaft configured to attach a respective one of the track rollers to the load, wherein the respective one of the track rollers is rotatably coupled to the shaft such that the track roller can rotate relative to the shaft.

10. The actuator of claim 1, wherein the helical track has a pitch that is constant from the first end to the second end such that when the cylindrical outer surface is rotated at a constant rotational speed, the at least one track follower moves at a constant rate between the first and second ends along the axial direction.

11. The actuator of claim 1, wherein the helical track has a pitch that varies between the first end and the second end such that when the cylindrical outer surface is rotated at a constant rotational speed, the at least one track follower moves at a varying rate between the first and second ends along the axial direction.

12. The actuator of claim 11, wherein the pitch is smaller adjacent to at least one of the first and second ends than it is between the first and second ends such that a rate at which the at least one track follower travels along the axial direction decreases towards the at least one of the first and second ends.

13. A method of moving a load with an actuator, the method comprising:
   causing an internal motor that is disposed within a cylindrical outer surface of a roller of the actuator to rotate the cylindrical outer surface about at least one shaft, such that the cylindrical outer surface rotates relative to first and second shaft ends of the at least one shaft that extend outward from a cylindrical body of the roller along a central axis, and to thereby cause a helical track disposed around the cylindrical outer surface to rotate in a first rotational direction with the cylindrical outer surface; and
   causing at least one track follower of the actuator that is coupled to the load to ride along at least one guide surface of the helical track to thereby cause the load to translate linearly along a first axial direction that is substantially parallel to the central axis.

14. The method of claim 13, wherein the rotating step comprises causing a motor of the actuator to rotate the cylindrical outer surface.

15. The method of claim 14, wherein the rotating step comprises causing the motor to rotate the cylindrical outer surface at a constant speed, and the helical track has a variable pitch such that the causing step comprises causing the at least one track follower to move at different speeds along the first axial direction as the at least one track follower rides along the at least one guide surface.

16. The method of claim 14, wherein the motor is an internal motor that is disposed within the cylindrical outer surface.

* * * * *